United States Patent [19]

Ito et al.

[11] Patent Number: 4,724,371
[45] Date of Patent: Feb. 9, 1988

[54] APPARATUS FOR DETECTING THE DEGREE OF ROTATION OF A ROTATIONAL AXIS

[75] Inventors: Yoshizumi Ito; Yasuo Ishiguro, both of Toyota; Osamu Shiroshita, Aichi, all of Japan

[73] Assignees: Toyota Jidosha Kabushiki Kaisha; Kabushiki Kaisha Toyota Cho Kenkyusho, both of Aichi, Japan

[21] Appl. No.: 910,223

[22] PCT Filed: Feb. 20, 1986

[86] PCT No.: PCT/JP86/00081
§ 371 Date: Aug. 18, 1986
§ 102(e) Date: Aug. 18, 1986

[87] PCT Pub. No.: WO86/05011
PCT Pub. Date: Aug. 28, 1986

[30] Foreign Application Priority Data

Feb. 21, 1985 [JP] Japan .............................. 60-23907[U]

[51] Int. Cl.⁴ ........................................... G05R 19/29
[52] U.S. Cl. .................................... 318/603; 318/599; 318/601
[58] Field of Search ............... 318/603, 640, 480, 601, 318/599, 626, 675, 466–468

[56] References Cited

U.S. PATENT DOCUMENTS

| | | | |
|---|---|---|---|
| 4,353,020 | 10/1982 | Veale | 318/601 |
| 4,360,769 | 11/1982 | Selkey et al. | 318/603 |
| 4,366,421 | 12/1982 | Eto et al. | 318/603 |
| 4,570,113 | 2/1986 | Linton et al. | 318/601 |

FOREIGN PATENT DOCUMENTS 53-48285 5/1978 Japan.
0111606 7/1982 Japan.

Primary Examiner—William M. Shoop, Jr.
Assistant Examiner—D. Martin
Attorney, Agent, or Firm—Parkhurst & Oliff

[57] ABSTRACT

The present invention provides a rotation detection apparatus of a rotational axis connected to an output axis system of a reduction gear to count the rotation of a rotational axis driven rotationally, including a reduction gear, with an integer reduction ratio, whose rotational axis of a driving source is connected to an input axis. The apparatus provides a position signal once every rotation of the output axis, and a rotation angle signal in response to the rotation angle of said input axis is output to correlate said output position signal with one of said rotation angle signals to count the rotation of the rotational axis by these position and rotation angle signals. An accurate rotation can be detected even at one-way high-speed rotation.

3 Claims, 4 Drawing Figures

| C PHASE OUTPUT OF ROTARY ENCODER 42 : ○ | OUTPUT OF PROXIMITY SWITCH 18 : ● |

APPARATUS FOR DETECTING THE DEGREE OF ROTATION OF A ROTATIONAL AXIS

BACKGROUND OF THE INVENTION

This invention relates to a rotation detection apparatus for determining the degree of rotation of a rotational axis driven rotationally.

Actuators for rotating a rotational axis, and controllers for carrying out complicated controls such as a numerical control of rotation and a feed back control in response to rotational speed, have been proposed.

For example, when an arm of a robot for industrial use rotates to some predetermined angle, a predetermined operation such as welding or deburring is executed. Such rotation detection of a rotational axis is an indispensable technique today, when a lot of automatic controls are used and a lot of devices are prepared. Digital techniques of rotation detection are particularly prevalent since they are quite precise and the price of digital circuits is going down. In digital rotation detection, pulse signals in response to a rotation angle by a rotary encoder, etc. are received, and rotation of the rotational axis is determined by a count of the pulse signals.

Both an absolute type and an incremental type of encoder are known. Absolute encoders are capable of detecting rotation on the spot of switch-on, but they are expensive. Incremental encoders are cheap, but they are incapable of detecting rotation of the spot on switch-on, but rather require provision of an origin (zero point) by some apparatus. Once the origin is given degree of rotation can be detected by detecting relative rotation therefrom by integration.

Today, incremental encoders are more often used as rotation detectors because of their inexpensiveness, and when a lot of encoders are required incremental encoders are more often used.

Detection of the zero point of the rotational axis is indispensable to the use of an incremental type encoder as a rotation detector. One method for detection of the zero point is to detect a specific position of an output axis by a position detection sensor, and to determine the origin when an origin signal, which is output once every rotation of the incremental type encoder provided at an input axis connected to the output axis via a reduction gear, coincides with the position signal.

Such a rotation detector for the rotational axis, however, is not sufficient when the rotational axis rotates a lot, since the following problems remain. An absolute type rotation detector has a finite detection capacity and cannot detect a rotating degree of the rotational axis infinitely. Incremental type rotation detectors are much more often used when infinite rotations of the rotational axis are detected, but the following origin-determination is required. When the rotational axis rotates finitely, one point in that limited rotation is taken as the origin, but when the rotational axis rotates infinitely, precise origin determination cannot be obtained even if a special position on the output axis is taken as the origin.

Thus, an origin on the input axis does not necessarily coincide with that on the output exis even when the output axis is on the origin determination position since the rotation is detected at the input axis. In case of a reduction ratio 1:1, for example, to reassure the origin by rotating the output axis once or more, the position to be detected by the position detection sensor cannot be detected except when there is a specific relation (every ten rotations of the output axis), since with an output of once/rotation of the rotational axis, an output origin signal detected by the rotation detection sensor is generated per 1/1.1 rotation.

As can be seen in this case, when higher rotation is required, in order to set the origin in switching on or off, the output axis must be rotated until a simultaneous output of the origin signals of both the position detection sensor and the rotation detector is achieved.

However, in general, since the reduction ratio is large and a decimal part is long, considerable rotation is required to gain the origin determination position.

The pulse signals from the rotary encoder, etc. are continuously input as long as the rotational axis rotates. An overflow always occurs at some point, since the counting capacity is not infinite.

Thus, the rotation of the rotational axis was conventionally detected by setting the maximum in advance, for example, under such limitation as only one clockwise or counterclockwise rotation. This characteristic has affected the operation of the robot in its efficiency, since the mode of operation must have been limited. For example, when applying to the robot for industrial use, to rotate an arm counterclockwise for one operation and further counterclockwise for the next operation, the arm must be returned to the original position by rotating it clockwise after the first operation before proceeding to the next operation. It is one of the factors that generate a disadvantageous influence to decrease moving efficiency of the robot.

SUMMARY OF THE INVENTION

It is an object of this invention to solve the aforementioned problems by providing an improved rotation detection sensor of the rotational axis which can detect the rotation precisely even when the rotational axis rotates one way and at a high speed.

The construction of this invention resides in a rotation detection apparatus which overcomes the aforementioned problems including: a reduction gear with integer reduction ratio, having an input axis which is connected to a rotational axis of a driving source; a position detection sensor connected to an output axis of the reduction gear for generating a position signal once every rotation of the output axis; a rotation angle detection sensor provided to the input axis for providing an output rotation signal in response to a rotation of the input axis and for providing a simultaneous output of the position signal and one of the rotation signals; and a counting circuit responsive to the position signal and the rotation signal for counting the rotation of the rotational axis.

The reduction gear in this invention receives an input rotation from a power source, for example, motors, etc., and rotates the output axis at the integer reduction ratio. Thus, the most simple example of this is the one which has a reduction mechanism with a spur gear having integer teeth ratio. The position detection sensor is included in the output axis system which is driven by the output axis and provides the position signal every rotation of the output axis. The position signal is output upon every appearance of some characteristic, as for example a reflecting disk or a magnet attached at some fixed position on the output axis.

The rotation angle detection sensor outputs a rotation angle signal in response to the rotation angle of the input axis. The input axis rotates integer times per rotation of the output axis by the operation of the reduction gear. Thus the rotation angle signal from the rotation angle detection sensor is always output plural times per rotation while the position signal generated by the position detection sensor is output once every rotation of the output axis. By this invention, it is intended to achieve coincidence of the position signal and one of the rotation angle signals by previously regulating these two signals.

For example, when a conventional rotary encoder is used as a rotation angle detection sensor, many detector holes (phase A, phase B) drilled along the circle with phase difference are used to determine the rotation, while an output generated by the detector hole drilled only once. On the circle (phase C) is designed to be provided in synchronism with the position signal.

A counting circuit is constructed of well-known counters, etc., which count up or count down whenever the position signal and the rotation angle signal generated by the position detection sensor and the rotation angle detection sensor are input, and counts the rotation of the rotational axis.

DESCRIPTION OF THE PREFERRED EMBODIMENTS

If a one way rotation is continually kept going after switching-on, a counter overflows, since an infinite counting is impossible. Continuous rotation without overflow, however, can be obtained if the counter is reset by replacement of an origin before the overflow. However, a complicated and time-consuming operation which resumes after determining the origin by replacement of the origin to a new position is required, since the origin determination in the foregoing is only possible on a predetermined origin determination point.

In the mode of the embodiment of this invention, if the result by a rotation angle detection sensor is judged to be over the limit of the counting capability of a counting circuit, a control circuit changes the count to a smaller number. In this mode of the embodiment, with the foregoing, the control of the rotation having as much precision as a numerically controlled conventional rotational axis, and a one-way high-speed rotation being achieved by rewriting a counter number to replace the rotation angle of an output axis thereto within ±180° before the counting circuit, such as counters which add or subtract pulses generated by the rotation angle detection sensor at a high speed rotation, overflows without the operation of the origin determination can be obtained. In another mode of the embodiment, which has as good of operational effects as the aforementioned mode, the control circuit is so constituted as: to operate by dividing the value C detected by a rotation detection sensor into n×Co, the multiple of n and Co, and a fraction m (whose amplitude is below Co), where n is an integer coefficient and Co corresponds to one turn of an output axis detected by the rotation detection sensor; to compare the integer coefficient n of the Co detected by the rotation detection sensor with a limitative coefficient l which corresponds to a limitative count of the counter circuit; and to replace the count of the count circuit with the fraction at the time when the coefficient exceeds the limitative coefficient l.

The following operation by the following expression for the fraction m, is also available:

$$m = C - F(C/Co) \times Co$$

where F(C/Co) is an integer obtained by half-adjust of the fraction of the division C/Co.

A detailed description of the present invention and the embodiment will now be provided.

Figure 1:
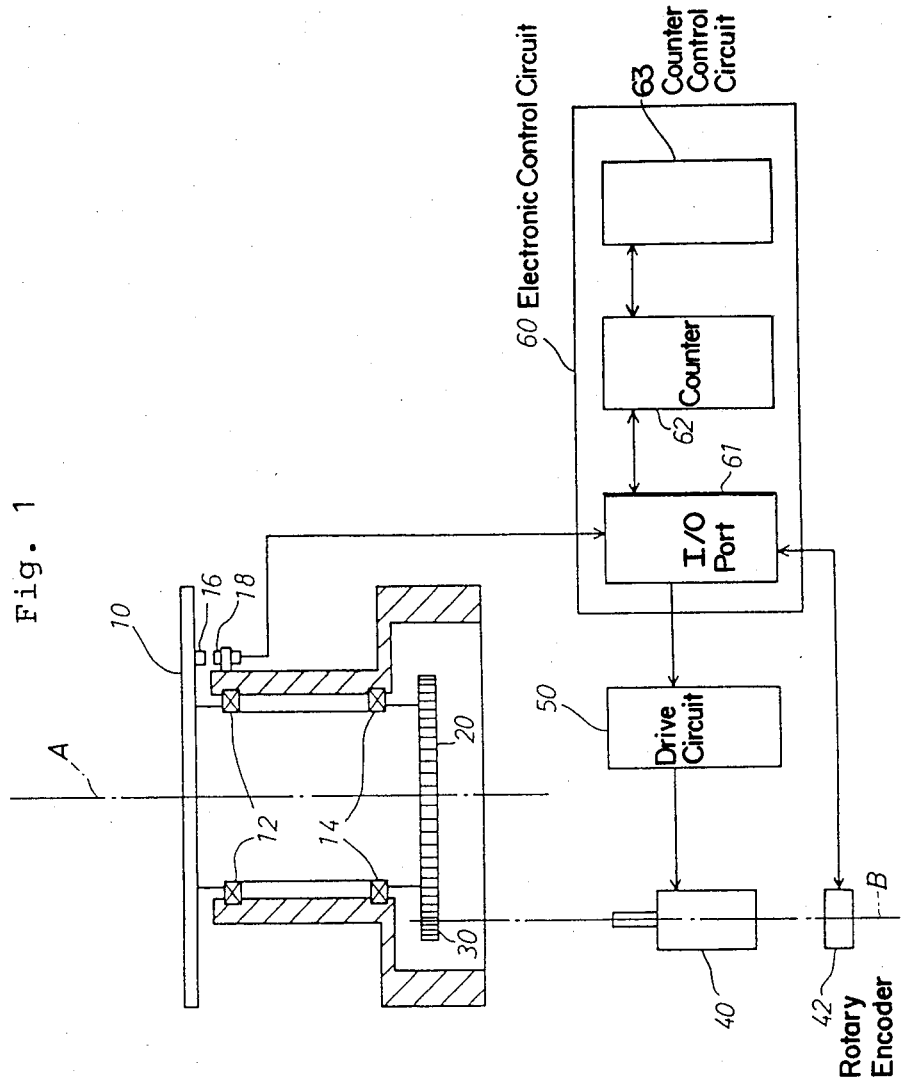
FIG. 1 is a brief diagram showing a construction of a rotary table embodying the present invention, including a rotation detection apparatus.

FIG. 1 shows a brief diagram of a rotary table including a rotation detection apparatus of the rotational axis of the embodiment. In the drawings, 10 denotes a table of the rotary table, integrated into an upper portion of a large spur gear 20 and pivotally supported by two bearings 12 and 14 with a central axis A. The large spur gear 20 is engaged with a small spur gear 30 and the gear ratio of large and small gears is 8:1. A motor 40 rotates the small spur gear 30 around an axis B. 50 denotes a drive circuit which drives the motor 40 by armature current.

Figure 2:
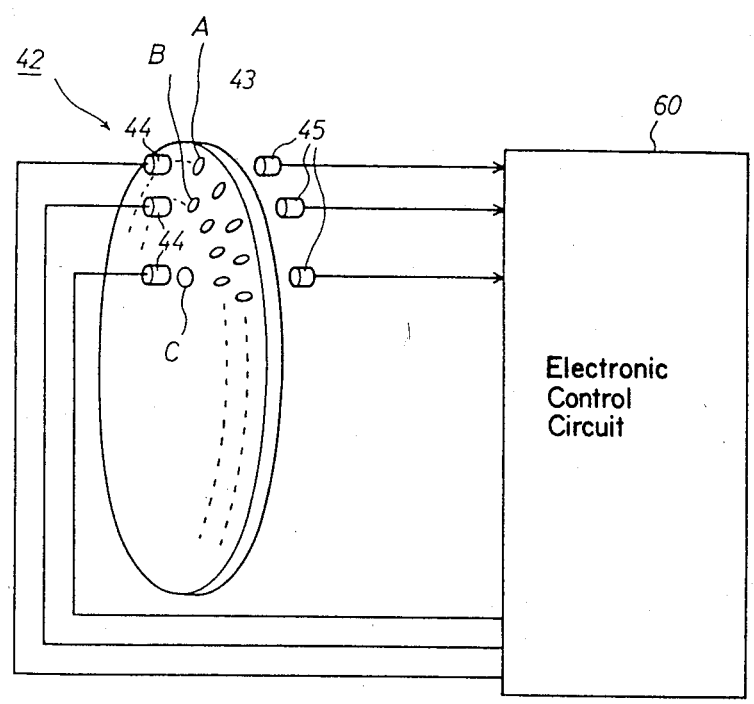
FIG. 2 is a construction of a rotary encoder.

Also provided in this system are two sensors. One of them is a position sensor comprising a magnet 16 which is a to-be-detected member put on one point on a lower surface of the table and a proximity switch 18 which provides an electronic control circuit 60 with an output signal by the motion of an inner armature iron strip movable when the magnet approaches. The other sensor is a rotary encoder 42 provided at the rotational axis of the motor 40. Detailed construction of the rotary encoder 42 is shown in FIG. 2. The rotary encoder 42 comprises a disk 43 which has light-passing holes on three concentric circles. The holes corresponding to a phase A and a phase B on the outermost and on the middle circles, respectively, have the phase difference of 1:4 to detect the direction of the rotation of the disk 43 and its rotation angle. A phase C on an innermost circle with only one hole is to detect a rotary position of disk 43. Opposing on either side of this disk 43 are light emitting portions 44 and light receiving portions 45 for the various phases. When the light emitting portion 44 emits light by the output of the electronic control circuit 60, the disk 43 rotates and the output signal is generated at the light receiving portions 45 and sent to the electronic control circuit 60 when either of the light-passing holes reaches a position where the light emitting portions 44 and the light receiving portions 45 are opposed.

The electronic control circuit 60 in FIG. 1 includes an input and output port 61 which receives the outputs of the proximity switch 18 and the rotary encoder 42, and provides electricity or a control signal to the drive circuit 50 and the rotary encoder 42; a counter 62 which counts up or counts down inputs through the input and output port 61; and a counter control circuit 63 which controls the contents of the counter 62.

Figure 3:
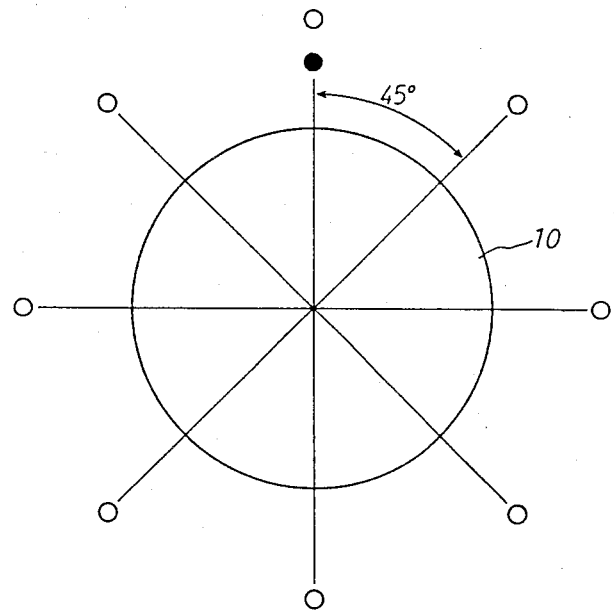
FIG. 3 is a phase diagram illustrative of the output of a proximity sensor and a rotary encoder.

The phases of the two sensors are so determined as to generate the detection output of the rotation detection apparatus of the rotational axis of this embodiment as shown in FIG. 3. Since 8 rotations of the small spur gear 30 are required for one turn of the table 10, the output of phase C of the rotary encoder 42 is generated every 360°/8 = 45°. The proximity switch 18 provided at the table 10, which outputs once every rotation, is predetermined to output simultaneously with either of the outputs of the rotary encoder 42. In some limited rotation angle around the table 10, the output of the proximity switch 18 might continuously occur, but the output of phase C within that limit is only one. Thus, the phase of the sensor is quite precisely determined.

The rotation of the table 10 is detected by the rotation detection apparatus of the rotational axis in the following manner.

First, the position of simultaneous outputs of the rotary encoder 42 and the proximity switch 18 in FIG. 3 is selected for an operational origin of the table 10. When the table 10 begins to rotate from this operational origin, the rotation angle of the table 10 is counted up to the counter 62 with as much precision as the numbers of the light-passing holes of phases A and B by their pulse putput, since the rotary encoder 42 rotates once every 45° rotation of the table 10. The holes in phases A and B are dug with a phase difference of 1:4 as mentioned above, and the reverse rotation of the table 10, where a counter 62 is counted down, also can be detected.

The precision for detecting the rotation angle of the table 10 according to the counter 62 is eight times better than that gained by the rotary encoder 42, since the table 10 rotates once every 8 rotations of the rotary encoder.

For the determination of the origin, the position of the origin of the output axis at which the phase C output by the rotary encoder and output by the proximity switch are simultaneously detected is only once every rotation of the output axis. Since a reduction ratio is an integer, even if the electronic control circuit is deenergized at any position in the course of the high-speed output axis rotation, and re-determination of the origin is executed, the same position of the output axis can be obtained.

At high-speed rotation of the table 10 like this, overflow of the counter 62 may occur, since its capacity is not infinite. However, the counter control circuit 63 always replaces the contents of the counter 62 with the result of the following equation. That is an operation is performed for replacement of the contents C of the counter 62 with the calculation result $\theta$, ($\theta = C - A' \times Co$), where A' is a half-adjust of the fraction of the division $A = C/Co$, C is the contents of the counter 62, and Co is the count of the rotary encoder 42 output every rotation of the table 10.

Accordingly the contents of the counter 62 are updated to the value representative of the rotation angle of ±180° from the operational origin to thereby avoid the overflow.

Figure 4:
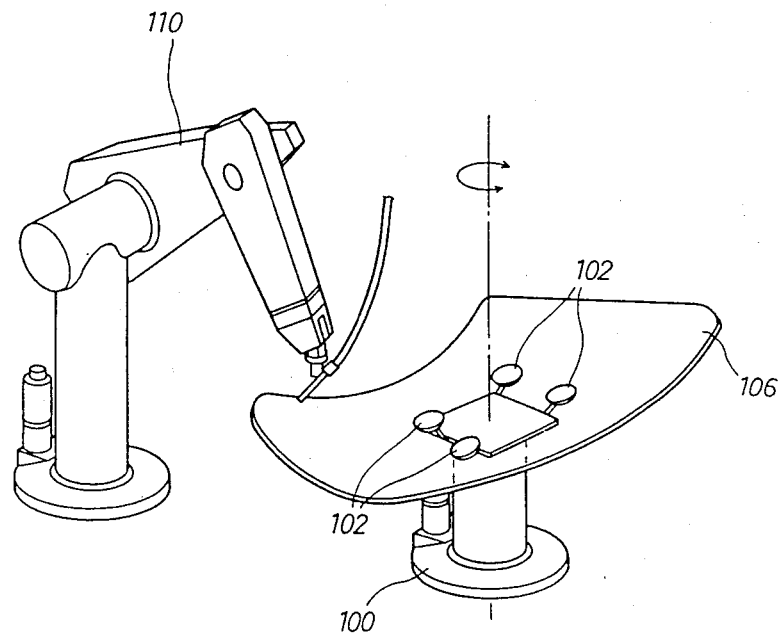
FIG. 4 is a brief diagram illustrative of the application of this embodiment to a robot for industrial use.

FIG. 4 shows one application of this rotary table system to which the rotation detection apparatus of the embodiment is attached.

In the drawings, 100 denotes the rotary table with four acetabulums 102 on it. 106 denotes a window glass for a vehicle to be dealt with, fixed on the table by the acetabulums 102. While the window glass 106 rotates once by the rotary table, a tool for the application of an adhesive agent, included in an arm of a robot 110, travels properly to accomplish the application of the adhesive agent along the whole frame of window glass 106.

According to the rotation detection apparatus of the invention, the rotation of the output axis can be determined by the rotation angle signal from the position where both the position signal in response to a position detection sensor and the rotation angle signal via a rotation angle detection sensor are output simultaneously. Since the reduction ratio of the reduction gear is an integer, at least one position exists where the position detection sensor determines during one rotation of the rotational axis in synchronism with the output of one of many holes of the rotation angle detection sensor and with the detector hole (phase C) by the rotation angle detection sensor.

With high-speed rotation of the rotational axis, the point which coincides with the output axis exists at least once every rotation of the output axis. Thus, the origin determination within one rotation of the output axis at the time of switch on after arbitrary cutting-off is made possible.

We claim:

1. An apparatus for detecting the degree of rotation of a rotational axis comprising:
   a reduction gear with an integer reduction ratio, said reduction gear having an input axis which is connected to a rotational axis of a driving source;
   position detection means connected to an output axis of said reduction gear for generating a position signal once every rotation of the output axis;
   rotation angle detection means provided proximate to said input axis for providing an output rotation signal in response to rotation of said input axis, and for providing a simultaneous output of said position signal and said rotation signal; and
   counting means responsive to said position signal and said rotation signal for counting rotation of the rotational axis.

2. A rotation detection apparatus as set forth in claim 1, wherein said counting means comprises means for judging if a count of said rotation angle detection means exceeds a counting capability of the counting means, and control means for replacing said count with a smaller value if said counting capability is exceeded.

3. A rotation detection apparatus as set forth in claim 2, wherein said control means comprises:
   means for separating a value C detected by said rotation angle detection means into components in accordance with the equation $C = (n \times Co) + m$, where C is a value of said output rotation signal of said rotation angle detection means, Co is a value of C for one rotation of said output axis, n is an integer coefficient, and m is a residual having a value less than Co;
   means for comparing the coefficient n with a maximum coefficient which corresponds to the counting limitation of the counting means; and
   means for replacing the count of the counting means with the residual m when said coefficient n exceeds said maximum coefficient.

* * * * *